United States Patent [19]
Fleck et al.

[11] 3,928,329
[45] Dec. 23, 1975

[54] BIS-V-TRIAZOLYL-STILBENES

[75] Inventors: Fritz Fleck, Bottmingen; Horst Schmid, Munchenstein, both of Switzerland; Alec Victor Mercer, Leeds; Roger Paver, Eldwick, both of England

[73] Assignee: Sandoz Ltd., Basel, Switzerland

[22] Filed: May 13, 1974

[21] Appl. No.: 469,105

[30] Foreign Application Priority Data
May 17, 1973 Switzerland........................ 7045/73

[52] U.S. Cl.................... 260/240.1; 117/33.5 T; 252/301.2 W; 252/301.3 W; 260/240 C; 260/295 F; 162/162
[51] Int. Cl.²................ C07D 401/14; C07D 413/14
[58] Field of Search .......... 260/240.1, 240 C, 295 F

[56] References Cited
UNITED STATES PATENTS

| | | | |
|---|---|---|---|
| 3,272,831 | 9/1966 | Buell et al. ....................... | 260/295 F |
| 3,595,859 | 7/1971 | Schellhammer................. | 260/240 C |
| 3,708,475 | 1/1973 | Kirchmayr ...................... | 260/240 C |

FOREIGN PATENTS OR APPLICATIONS

2,133,159  1/1973  Germany

*Primary Examiner*—Arthur P. Demers
*Attorney, Agent, or Firm*—Gerald D. Sharkin; Richard E. Vila; Joseph J. Borovian

[57] ABSTRACT
The invention provides compounds of formula I,

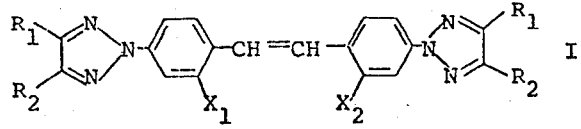

in which $X_1$ and $X_2$, independently, each signifies hydrogen, chlorine or a group selected from $-SO_3M$, $-COOM$, $-SO_2NR_3R_4$, $-CONR_3R_4$, $-SO_3R_5$, $-CN$, $-CO_2R_5$ and $-SO_2R_6$,
in which either $R_3$ signifies hydrogen; $C_{1-6}$alkyl, unsubstituted or substituted by hydroxy or phenyl; cyclohexyl; or phenyl, unsubstituted or substituted by one or more substituents selected from halogen, $C_{1-6}$alkyl or alkoxy, cyano or $-SO_3M$,
and $R_4$ signifies hydrogen or $C_{1-6}$alkyl, unsubstituted or substituted by hydroxy,
or $R_3$ and $R_4$, together with the nitrogen to which they are attached, signify a piperidine, pyrrolidine, morpholine or N-methylpiperazine ring,
$R_5$ signifies $C_{1-6}$alkyl, unsubstituted or substituted by $C_{1-6}$alkoxy; or phenyl, unsubstituted or substituted by one or more substituents selected from $C_{1-6}$alkyl, $C_{1-6}$alkoxy, fluorine, chlorine or cyano,
$R_6$ signifies $C_{1-6}$alkyl, unsubstituted or substituted by hydroxy, $C_{1-6}$alkoxy, $C_{1-6}$hydroxyalkoxy, aminocarbonyl or $-SO_3M$; or phenyl, unsubstituted or substituted by one or more substituents selected from $C_{1-6}$alkyl, $C_{1-6}$alkoxy, fluorine, chlorine or cyano,
the $R_1$'s, which are the same, each signify hydrogen; chlorine; $C_{1-6}$alkyl; or phenyl unsubstituted or substituted by one or more substituents selected from $C_{1-6}$alkyl, $C_{1-6}$alkoxy, fluorine, chlorine or phenyl,
the $R_2$'s, which are the same, each signify a radical of formula (a), (b) or (c),

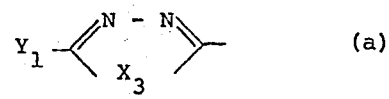

in which $Y_1$ signifies $C_{1-6}$alkyl; or phenyl, unsubstituted or substituted by one or more substituents selected from $C_{1-6}$alkyl, $C_{1-6}$alkoxy, fluorine, chlorine and $-SO_3M$, and
$X_3$ signifies -O- or $-NY_5-$, where $Y_5$ signifies hydrogen or $C_{1-6}$alkyl, unsubstituted or substituted by hydroxy, chlorine or $-SO_3M$,

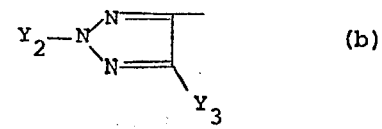

in which $Y_2$ signifies naphthyl, unsubstituted or substituted by $C_{1-4}$alkyl, $C_{1-4}$alkoxy or $-SO_3M$; or phenyl, unsubstituted or substituted by one or more substituents selected from fluorine, chlorine, $C_{1-6}$alkyl, $C_{1-6}$alkoxy and $-SO_3M$, and
$Y_3$ signifies hydrogen; chlorine; $C_{1-6}$alkyl; or phenyl, unsubstituted or substituted by one or more substituents selected from $C_{1-6}$alkyl, $C_{1-6}$alkoxy, fluorine, chlorine and $-SO_3M$; $-COOM$; $-CONR_3R_4$; or $-COOR_5$, and

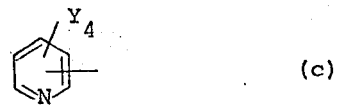

in which $Y_4$ signifies hydrogen or $C_{1-6}$alkyl,
and M signifies hydrogen or a non-chromophoric cation, their production and use as optical brightening agents, particularly for cellulosic and polyamide substrate.

38 Claims, No Drawings

BIS-V-TRIAZOLYL-STILBENES

IMPROVEMENTS IN OR RELATING TO ORGANIC COMPOUNDS

The invention relates to bis-v-triazolyl-stilbene compounds.

The invention provides compounds of Formula I,

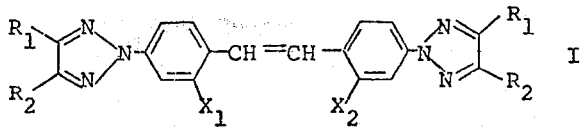

in which $X_1$ and $X_2$, independently, each signifies hydrogen, chlorine or a group selected from $-SO_3M$, $-COOM$, $-SO_2NR_3R_4$, $-CONR_3R_4$, $-SO_3R_5$, $-CN$, $-CO_2R_5$ and $-SO_2R_6$, in which either $R_3$ signifies hydrogen; $C_{1-6}$ alkyl, unsubstituted or substituted by hydroxy or phenyl; cyclohexyl; or phenyl, unsubstituted or substituted by one or more substituents selected from halogen, $C_{1-6}$alkyl or alkoxy, cyano or $-SO_3M$, and $R_4$ signifies hydrogen or $C_{1-6}$alkyl, unsubstituted or substituted by hydroxy, or $R_3$ and $R_4$, together with the nitrogen to which they are attached, signify a piperidine, pyrrolidine, morpholine or N-methylpiperazine ring, $R_5$ signifies $C_{1-6}$alkyl, unsubstituted or substituted by $C_{1-6}$alkoxy; or phenyl, unsubstituted or substituted by one or more substituents selected from $C_{1-6}$alkyl, $C_{1-6}$alkoxy, fluorine, chlorine or cyano, $R_6$ signifies $C_{1-6}$alkyl, unsubstituted or substituted by hydroxy, $C_{1-6}$alkoxy, $C_{1-6}$hydroxyalkoxy, aminocarbonyl or $-SO_3M$; or phenyl, unsubstituted or substituted by one or more substituents selected from $C_{1-6}$alkyl, $C_{1-6}$alkoxy, fluorine, chlorine or cyano, the $R_1$'s, which are the same, each signify hydrogen; chlorine; $C_{1-6}$ alkyl; or phenyl unsubstituted or substituted by one or more substituents selected from $C_{1-6}$alkyl, $C_{1-6}$alkoxy, fluorine, chlorine or phenyl, the $R_2$'s, which are the same, each signify a radical of formula (a), (b) or (c),

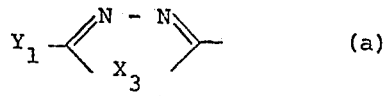

in which $Y_1$ signifies $C_{1-6}$alkyl; or phenyl, unsubstituted or substituted by one or more substituents selected from $C_{1-6}$alkyl, $C_{1-6}$alkoxy, fluorine, chlorine and $-SO_3M$, and $X_3$ signifies $-O-$ or $-NY_5-$, where $Y_5$ signifies hydrogen or $C_{1-6}$alkyl, unsubstituted or substituted by hydroxy, chlorine or $-SO_3M$,

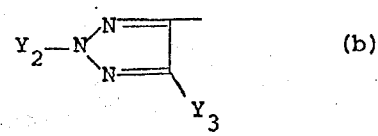

in which $Y_2$ signifies naphthyl, unsubstituted or substituted by $C_{1-6}$alkyl, $C_{1-4}$alkoxy or $-SO_3M$; or phenyl, unsubstituted or substituted by one or more substituents selected from fluorine, chlorine, $C_{1-6}$alkyl, $C_{1-6}$alkoxy and $-SO_3M$, and $Y_3$ signifies hydrogen; chlorine; $C_{1-6}$alkyl; or phenyl, unsubstituted or substituted by one or more substituents selected from $C_{1-6}$alkyl, $C_{1-6}$alkoxy, fluorine, chlorine and $-SO_3M$; $-COOM$; $-CONR_3R_4$; or $-COOR_5$, and

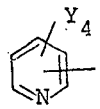

in which $Y_4$ signifies hydrogen or $C_{1-6}$alkyl, and M signifies hydrogen or a non-chromophoric cation.

Any alkyl or alkoxy radicals in the compounds of formula I are preferably of 1 to 4 carbon atoms, any hydroxy or $-SO_3M$ substituted alkyl radical being preferably of 2 to 4 carbon atoms.

The following alkyl, alkoxy and hydroxyalkyl radicals may be named as examples: methyl, ethyl, propyl, isopropyl, n-butyl, isobutyl, sec.butyl, tert.butyl, amyl, isoamyl, hexyl, methoxy, ethoxy, propoxy, isopropoxy, n-butoxy, tert.butoxy, amyloxy, hexyloxy, β-hydroxyethyl, β-hydroxypropyl, γ-hydroxypropyl, 2-, 3- or 4-hydroxybutyl-1 and 3- or 4-hydroxybutyl-2. The alkoxyalkyl radicals and the hydroxyalkoxyalkyl radicals contain preferably 3 to 8 carbon atoms. The following may be named as examples: methoxyethyl, ethoxyethyl, propoxyethyl, isopropoxyethyl, butoxyethyl, isobutoxyethyl, 2- or 3-ethoxypropyl, 2- or 3-propoxypropyl, 2- or 3-isopropoxypropyl, 2(2′-hydroxyethoxy)-ethyl, 2(2′- or 3′-hydroxypropoxy)-ethyl, 2- or 3-(2′-hydroxyethoxy)-propyl, 2- or 3-(2′- or 3′-hydroxypropoxy)-propyl, 2-, 3- or 4-(2′-hydroxyethoxy)-butyl, 2-, 3- or 4-(2′- or 3′-hydroxypropoxy)-butyl, 2-, 3- or 4-(2′- or 3′-hydroxypropoxy)-butyl or 2-, 3- or 4-(2′-, 3′- or 4′-hydroxybutoxy)-butyl.

Any phenyl radical which is substituted by one or more substituents selected from alkyl, alkoxy, halogen, cyano and $-SO_3M$ preferably bears one or two such substituents, but preferably no more than one cyano or $-SO_3M$ group. Any alkyl or alkoxy substituents are preferably in the meta and/or para position of said phenyl radical. Where any phenyl radical bears phenyl as substituent, such phenyl radical is preferably only mono-substituted, the phenyl substituent preferably being in the para position thereof.

As examples of amines $HNR_3R_4$, from which groups $-SO_2NR_3R_4$ and $-CONR_3R_4$ are derived, may be given ammonia, methylamine, ethylamine, propylamine, isopropylamine, butylamine, hexylamine, cyclohexylamine, benzylamine, 2-phenylethylamine, aniline, toluidine, xylidine, mesidine, o-, m- or p-ethylaniline, m- or p-anisidine, 2,4-, 3,4- or 2,3-dimethyloxyaniline, phenethidine, sulphanilic acid, methanilic acid (optionally in salt form), p-chloraniline, p-fluoraniline, 1-amino-4-cyanobenzene, dimethylamine, diethylamine, dipropylamine, dibutylamine, N-methyl-N-ethyl-, -propyl-, -butyl-, -cyclohexyl-, -benzyl-, -2-phenylethyl-, -phenyl-, -metehylphenyl-, -dimethyl-phenyl, -p-chlorophenyl- and -p-sulphophenylamine, as well as the corresponding N-ethyl- substituted amines; also monoethanolamine, diethanolamine, monopropanolamine, dipropanolamine, pyrrolidine, piperidine, morpholine and N-methylpiperazine.

Where the substituents $X_1$ and $X_2$ are the same, they both preferably signify hydrogen, $-SO_3M$, $-SO_2NR_3R_4$, $-SO_3R_5$ or $-SO_2R_6$. Where they are different, preferably one of $X_1$ and $X_2$ signifies hydrogen, the other -COOM, $-CONR_3R_4$, $-CO_2R_5$ or cyano. Preferably $X_1$ and $X_2$ both signify $-SO_3M$ groups.

Where M signifies a cation, the exact nature of the cation is not critical, provided it is not chromophoric. Any conventional cation used in the optical brightener art may be employed. As Examples of suitable cations may be given the alkali-metal cations e.g. sodium, potassium and lithium cations, the alkaline earth metal cations, e.g. magnesium, calcium and strontium cations, and the ammonium and substituted or unsubstituted alkylammonium cations, e.g. the cations of formula $R_{10}R_{11}R_{12}NH^+$, where $R_{10}$, $R_{11}$ and $R_{12}$, independently, each signify hydrogen or a $C_{1-4}$ alkyl radical, unsubstituted or substituted by up to two, preferably one, hydroxy group, such as mono-, di- and triethanolammonium, mono-, di- and triisopropanolammonium and mono-, di- and triethylammonium cations.

In the compounds of formula I, $R_1$ preferably signifies hydrogen, $C_{1-4}$alkyl, chlorine, unsubstituted phenyl or phenyl substituted by a chlorine atom, more preferably hydrogen, $C_{1-4}$alkyl, especially methyl, or chlorine, most preferably methyl or hydrogen.

Where the $R_2$'s signify radicals of formula (a), $Y_1$, therein, preferably signifies a $C_{1-4}$alkyl radical, an unsubstituted phenyl radical or a phenyl radical substituted by a substituent selected from $C_{1-4}$alkyl, $C_{1-4}$alkoxy, chlorine and $-SO_3M$ and, where $X_3$ therein signifies $-NY_5-$, $Y_5$ preferably signifies hydrogen or $C_{1-4}$alkyl.

Where the $R_2$'s signify radicals of formula (b), $Y_2$ therein preferably signifies an unsubstituted phenyl radical or a phenyl radical substituted by up to two substituents selected from $C_{1-4}$alkyl, $C_{1-4}$alkoxy, chlorine or $-SO_3M$, provided that only one $-SO_3M$ group is borne thereby. $Y_3$ preferably signifies an alkyl radical of 1 to 4 carbon atoms. $Y_3$ and $R_1$ are preferably different. Where the $R_2$'s signify radicals of formula (b), one of $R_1$ and $Y_3$ preferably signifies hydrogen.

Where the $R_2$'s signify radicals of formula (c), $Y_4$, therein, preferably signifies hydrogen.

As a preferred class of compounds of formula I may be given the compounds of formula I',

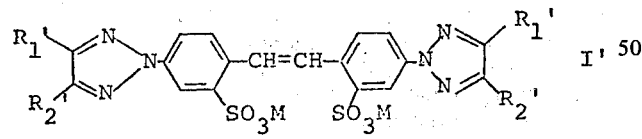

in which the $R_1'$'s, which are the same, each signify hydrogen, chlorine or $C_{1-4}$alkyl,
the $R_2'$'s, which are the same, each signify a radical of formula (a'), (b') or (c'),

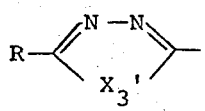

where R signifies a $C_{1-4}$alkyl radical, an unsubstituted phenyl radical or a phenyl radical substituted by a substituent selected from $C_{1-4}$alkyl, $C_{1-4}$alkoxy, chlorine and $-SO_3M$, and $X_3'$ signifies -O- or $-NY_5'-$ where $Y_5'$ signifies hydrogen or $C_{1-4}$alkyl,

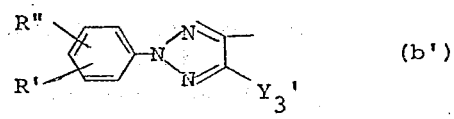

where R' signifies hydrogen, chlorine, $C_{1-4}$alkyl, $C_{1-4}$alkoxy or $-SO_3M$,
R" signifies hydrogen, chlorine, $C_{1-4}$alkyl or $C_{1-4}$alkoxy, and
$Y_3'$ signifies an alkyl radical of 1 to 4 carbon atoms,

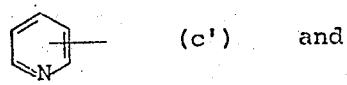 and

M is as defined in connection with formula I, above.

In the compounds of formula I', $R_1'$ and $Y_3'$ are preferably different.

In the preferred group of compounds of formula I', $R_1'$ signifies hydrogen or methyl and $R_2'$ signifies a radical of formula (a") or (b"),

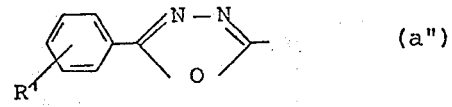

in which R' is as defined above,

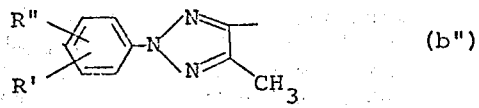

in which R' and R" are as defined above, with the proviso that where $R_2'$ signifies a radical of formula (b"), $R_1'$ signifies hydrogen.

In such compounds $R_2'$ preferably signifies a radical of formula (b"). R" preferably signifies hydrogen.

The invention also provides a process for the production of compounds of formula I, comprising
a. cyclising a compound of formula II,

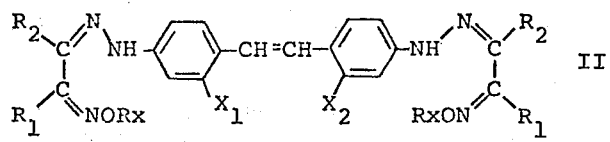

in which $X_1$, $X_2$, The $R_1$'s and $R_2$'s are as defined above, and
the Rx's signify hydrogen or an acyl group,
b. reducing an N-oxide of formula III,

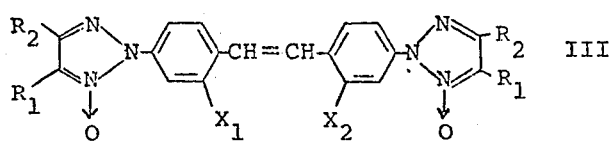

in which $X_1$, $X_2$, the $R_1$'s and $R_2$'s are as defined above,
c. obtaining a compound of formula Ia

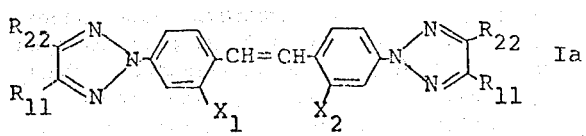   Ia in which $X_1$ and $X_2$ are as defined above, and the $R_{11}$'s signify $C_{1-6}$alkyl; unsubstituted phenyl or phenyl substituted by one or more substituents selected from $C_{1-6}$alkyl, $C_{1-6}$alkoxy, fluorine, chlorine or phenyl, and the $R_{22}$'s signify a radical of formula (c), by ci) cyclising a compound of formula IV,

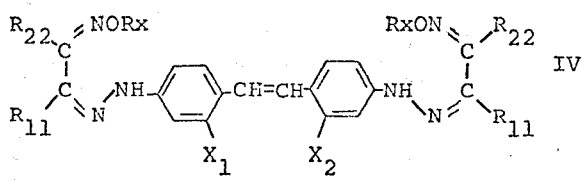   IV in which $X_1$, $X_2$, the $R_{11}$'s, $R_{22}$'s and Rx's are as defined above, or cii) reducing an N-oxide of formula V,

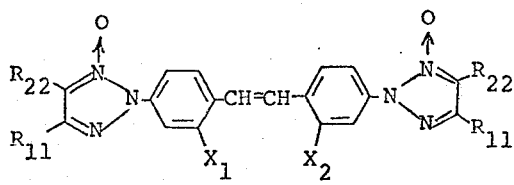   V in which $X_1$, $X_2$, the $R_{11}$'s and $R_{22}$'s are as defined above, d. obtaining a compound of formula I, wherein the $R_1$'s signify chlorine and the $R_2$'s bear no -$SO_3M$ group by reacting with hydrogen chloride, a compound of formula III in which the $R_1$'s signify hydrogen and the $R_2$'s bear no -$SO_3M$ group, e. obtaining a compound of formula I, wherein $R_2$ signifies a radical of formula (a) and $X_3$, therein, signifies -O-, by cyclising a compound of formula VI,

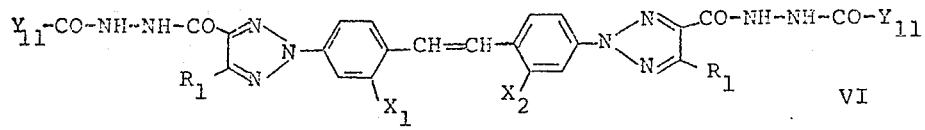   VI in which $X_1$, $X_2$ and the $P_1$'s are as defined above, and the $Y_{11}$'s, which are the same, signify $C_{1-6}$alkyl, unsubstituted phenyl or phenyl substituted by one or more substituents selected from $C_{1-6}$alkyl, $C_{1-6}$alkoxy, fluorine, chlorine or -$SO_3Ry$, where -$ORy$ is the radical of a low-molecular weight alcohol, e.g. of methanol or ethanol, under dehydrating conditions and, where present, saponifying any -$SO_3Ry$ group in the resulting product to a -$SO_3M$ group.

f. obtaining a compound of formula I in which $X_1$ and $X_2$ each signify hydrogen, -CN, -$COOR_5$, -$SO_3R_5$ or -$SO_2Rz$, in which the $R_5$'s are as defined above, and Rz signifies $C_{1-6}$alkyl, unsubstituted or substituted by hydroxy, $C_{1-6}$alkoxy or $C_{1-6}$hydroxyalkoxy; or phenyl, unsubstituted or substituted by one or more substituents selected from $C_{1-6}$alkyl, $C_{1-6}$alkoxy, fluorine, chlorine or cyano; and $R_2$ signifies a radical of formula (a), $X_3$ therein signifying -$NY_5$-, by reacting a compound of formula VII,

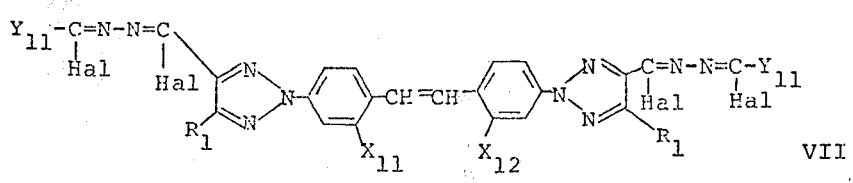   VII in which the $R_1$'s and $Y_{11}$'s are as defined above, Hal signifies a halogen atom, and $X_{11}$ and $X_{12}$, independently, each signifies hydrogen, -CN, -$COOR_5$, -$SO_3R_5$ or -$SO_2Rz$, where $R_5$ and Rz are as defined above, with an amine of formula VIII, $Y_5$-$NH_2$   VIII in which $Y_5$ is as defined above, and, where present, saponifying any -$SO_3Ry$ group in the resulting product to a -$SO_3M$ group, g. obtaining a compound of formula I in which $R_2$ signifies a radical of formula (a), $X_3$ therein signifies -$NY_5$-, and $X_1$ and $X_2$ both signify -$SO_3M$ or $X_1$ signifies hydrogen and $X_2$ signifies -COOM, by reacting a compound of formula IX,

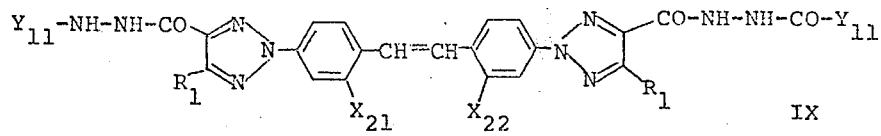   IX in which the $R_1$'s and $Y_{11}$'s are as defined above, and either $X_{21}$ and $X_{22}$ both signify -$SO_3M$ or $X_{21}$ signifies hydrogen, and $X_{22}$ signifies -COOM, with an amine of formula VIII at a temperature above 100°C, and, where present, saponifying any -$SO_3Ry$ group in the resulting product to a -$SO_3M$ group, or h. obtaining a compound of formula I in which $R_3$, $Y_1$, $Y_2$ or $Y_3$ signifies a phenyl radical substituted by -SO₃M by sulphonating a compound of formula I in which $R_3$, $Y_1$, $Y_2$ or $Y_3$ signify a phenyl radical free from -SO₃M groups.

Process a) is conveniently carried out in conventional manner. Where, in the compound of formula II Rx signifies hydrogen, the reaction involved is essentially a dehydration reaction with simultaneous ring closure. This is conveniently carried out by heating the compound of formula II in an organic solvent in the presence of a tertiary amine base and a dehydrating agent. As examples of dehydrating agents may be given phosphorus trichloride, phosphoric acid halides such as the oxychloride and phosphorus pentachloride, carboxylic acid halides, carboxylic acid anhydrides and phosphoric acid anhydride. The carboxylic anhydrides are preferred, the preferred carboxylic anhydrides being those derived from low molecular fatty acids, such as from acetic, propionic and butyric acids. As examples of suitable solvents for the reaction may be given aromatic hydrocarbons, chlorinated hydrocarbons, ethers, ketones, acid amides, sulphoxides and sulphones, the preferred solvents being acid amides, sulphoxides and sulphones, e.g. dimethylformamide, diethylformamide, dimethylacetamide, N-methylpyrrolidone, dimethylsulphoxide, dibutylsulphoxide, tetramethylene sulphone (sulpholan) and phosphoric acid hexamethyltriamide. As examples of suitable tertiary amine bases may be given diethylaminobenzene, dimethylaminobenzene, quinoline, pyridine and alkylpyridines. The preferred temperature for the reaction is from 20° to 200°C, particularly from 50° to 175°C, the temperature preferably being raised in stages, first to 80°C, then to 100°C and finally to the boiling point of the reaction mixture.

In an alternative method, the compound of formula II may be cyclised simply by heating in a high boiling point solvent such as in a carboxylic acid amide, preferably urea. In this method a preferred temperature is from 100° to 210°C, more preferably from 120° to 185°C. The compound of formula II may simply be added into a urea melt without any preparation such as drying, since any water is driven off. It is of advantage to employ two to twenty, preferably three to fifteen, times the amount of urea in relation to the dry weight of the compound of formula II. It is also of advantage to employ a combination of urea with a lower fatty acid, such as acetic acid.

Process b) can be carried out in conventional manner for the reduction of triazole oxides to triazoles. The process can thus be carried out using base metals, e.g. iron filings or zinc dust, in acids, e.g. acetic acid, acetic acid/water mixtures and mixtures of acetic acid in inert organic solvents, e.g. chlorobenzene. Alternatively, the reduction can be carried out using zinc dust in sodium hydroxide solution or by usingg hydrogen in the presence of a reduction catalyst such as Pd, Pt or Raney Nickel, which catalyst is suitably on a support carrier of activated carbon. Such reduction may, for example, be carried out in aqueous alcohol or aqueous dimethylformamide. A Suitable temperature is from room temperature to about 150°C, preferably from 50° to 130°C. Lower temperatures can be employed if small amounts of an inorganic acid, such as hydrochloric acid are added to the reaction mixture. Reduction can also be effected using salts of reducing acids of sulphur or phosphorus.

Process ci) may be carried out in identical manner to process a), as described above.

Process cii) may be carried out in identical manner to process b), as described above.

Process d), which involves chlorination and simultaneous reduction may be carried out using hydrogen chloride, the hydrogen chloride conveniently being passed, in gaseous form, into a reaction medium of a dispersion of the compound of formula III in an aqueous medium of a watersoluble organic, preferably alcoholic or ether, solvent, such as ethanol, propanol, butanol, methylglycol, ethylglycol, ethyleneglycol, diethyleneglycol or dioxan, at an elevated temperature, preferably at reflux.

A similar halogenation reaction to that involved in process d), but not involving simultaneous reduction, may be carried out on a compound of formula III, in which the $R_1$'s signify hydrogen, by chlorination using a polar chlorinating agent such as sulphurylchloride, thionylchloride or phosphorylchloride to yield a compound of formula III in which the $R_1$'s signify chlorine, which compound of formula III can then be reduced following the procedure of process b), described above.

Process e) may be carried out in conventional manner for the type of reaction involved. For example, the compounds of formula VI may be cyclised by heating in the presence of a dehydrating agent, preferably in the presence of an inert solvent. Similarly, saponification of any -SO₃Ry groups to -SO₃M groups can be carried out in conventional manner.

Process f) may be carried out in conventional manner for the type of reaction involved. Thus, the compound of formula VII may be reacted with the amine of formula VIII in an inert solvent, preferably in the presence of a tertiary amine or inorganic base. Saponification of any -SO₃Ry groups to -SO₃M groups can also be carried out in conventional manner.

Process g) is preferably carried out at a temperature of from 100° to 200°C. The reaction is preferably carried out in an inert medium which acts as solvent for the amine of formula VIII, e.g. an ether, such as dioxan or a halogenated hydrocarbon. The reaction is conveniently carried out in an autoclave, particularly where volatile amines of formula VIII or low boiling point solvents are used. By employing an excess of the amine and a compound IX where M is hydrogen, the corresponding ammonium salt is formed. If required, this salt form can be converted back into free acid form or converted into different salt form, e.g. alkali metal salt form in conventional manner, e.g. by treatment with an alkali-metal hydroxide.

Process h) may be carried out in conventional manner for the sulphonation of phenyl radicals.

The resulting compounds of formula I may be isolated and purified in conventional manner.

The compounds of formula II, wherein Rx signifies an acyl radical may be obtained by simple acylation of compounds of formula II in which Rx is hydrogen, preferably in the presence of a tertiary amine base. The preferred acylating agent is acetic acid. Thus, where Rx signifies an acyl group, it preferably signifies an acetyl group.

The compounds of formula II, wherein Rx is hydrogen may be obtained in conventional manner. For example, the compounds of formula II where $R_1$ is $R_{11}$, as defined above, may be obtained by reacting a compound of formula X

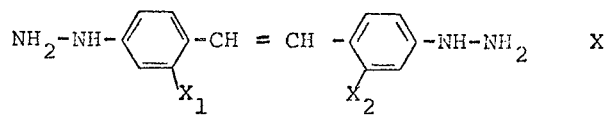

in which $X_1$ and $X_2$ are as defined above, with a compound of formula XI,

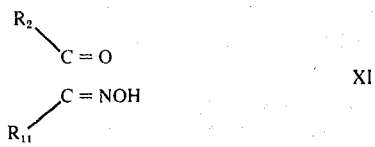

in which $R_3$ and $R_{11}$ are as defined above.

This reaction is suitably carried out in an inert, preferably polar, solvent, e.g. in aliphatic or aromatic halogenated hydrocarbons, alcohols, ethers, glycols, amides, such as formamide, dimethylformamide or -acetamide, phosphoric acid hexamethyltriamide, N-methylpyrrolidone, sulphoxides or sulphones, such as dimethylsulphoxide, tetramethylenesulphone or acetonitrile in a lower alkyl carboxylic acid, such as acetic or propionic acid. Suitable temperatures are in the range of 0° to 100°C, preferably 20° to 60°C. The reaction is preferably carried out in the presence of an acid, preferably a lower carboxylic acid, such as formic, acetic, propionic, butyric, oxalic, tartaric, lactic or citric acid.

The compounds of formula III may be obtained by oxidative cyclisation of compounds of formula I, in which Rx is hydrogen. This may be carried out in conventional manner for the type of reaction involved. For example, using a bichromate or hydrogen peroxide in acid, e.g. acetic acid, solution, or ferric potassium cyanide in basic solvent, such as in pyridine or pyridine/water mixtures. A preferred method involves the use of a copper (II) salt such as copper (II) sulphate, chloride or acetate in a pyridine/water mixture. The monovalent copper salt produced in the reaction can be regenerated into copper (II) salt form by passage of air or oxygen through the reaction mixture.

The compounds of formula V, used in process cii) may be obtained in analogous manner as described above for compounds III, by oxidative cyclisation of compounds of formula IV, where Rx, therein, signifies hydrogen.

The compounds of formula VI used in process e) may be obtained in conventional manner, e.g. those in which $X_1$ and $X_2$ are, respectively, $X_{11}$ and $X_{12}$ may be obtained by reacting a compound of formula XII,

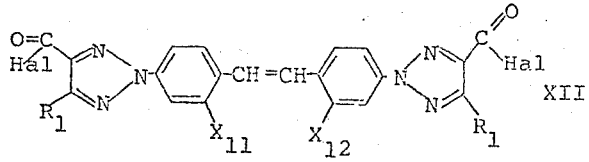

in which $X_{11}$, $X_{12}$ and the $R_1$'s and Hals are as defined above,
with a hydrazide of formula XIII,

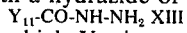
$Y_{11}$-CO-NH-NH$_2$ XIII in which $Y_{11}$ is as defined above, or by reacting a dihydrizide of a dicarboxylic acid of formula XIV,

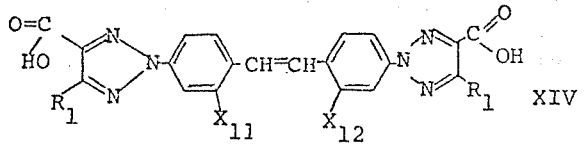

in which the $R_1$'s and $X_{11}$ and $X_{12}$ are as defined above,
with a compound of formula XV,

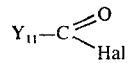

in which $Y_{11}$ and Hal are as defined above.

The above reactions may be carried out in conventional manner. For example, the reactions may be carried out in the presence of a tertiary amine base. Preferred temperatures are from 50° to 150°C. The reaction is preferably carried out in an inert solvent of low polarity and high boiling point. As examples of suitable tertiary amine bases may be given quinoline, pyridine, alkylpyridines, e.g. 2, 3, and 4-methylpyridine, ethylpyridine, and mixtures of such pyridines. As examples of suitable solvents may be given o-dichlorobenzene and trichlorobenzenes. The reactions can be carried out directly to the oxadiazole ring compounds by working at temperatures of from 120° to 220°C, preferably at reflux, in the presence of a pyridine base and slight excess of a dehydrating agent such as thionylchloride. The reaction can also be carried out in the melt (Indian Journal of Chemistry 6, 1968, page 172).

The compounds of formula VII, used in process f), may be obtained by halogenation of the the corresponding compounds of formula VI, in which $X_1$ and $X_2$ are $X_{11}$ and $X_{12}$, respectively, in conventional manner. For example, the halogenation can be carried out using a polar halogenating agent, preferably phosphorous pentabromide or phosphorus pentachloride.

The compounds of formulae IV, VIII, X, XI, XII, XIII, XIV and XV may be obtained in conventional manner from available starting materials.

The compounds of formula I are useful as fluorescent brightening agents.

Water soluble compounds of formula I, i.e. those containing at least two sulphonic acid groups may be employed for brightening substrates with substantivity to anions, e.g. polymethanes, basically modified polyolefines, cellulose, wool, synthetic polyamides, e.g. by exhaust or padding methods, and for the optical brightening of paper in the stock, or after sheet formation, e.g. during coating or sizing, or for the optical brightening of cellulosic textiles, e.g. by incorporation in synthetic resin finishings therefor.

The remaining sparingly water soluble or nonwater soluble compounds of formula I are suitable, for example, for the optical brightening of hydrophobic substrates, (e.g. polyester, polyolefines or polyacrylic material) or synthetic polyamides, e.g. by incorporation into the mass. They can be added to a pre-polymer before formation of the final polymer, and to spinning melts or solutions of the final polymer. Such compounds of formula I are also suitable for optically brightening hydrophobic fibres from aqueous dispersions.

Generally, the fluorescent brightening agents of formula I are employed at concentrations of approximately 0.005 to 1.5 percent relative to the weight of the substrate.

For application from long baths preferably 0.05 to 0.8 percent of the optical brightener relative to the substrate is used; the liquor to goods ratio is preferably 10:1 to 50:1 and the treatment temperature preferably 30° to 60°C. The liquor may contain further assistants, e.g. exhaust assistants, or bleaching agents, e.g. sodium chlorite.

In padding processes, particularly continuous padding processes, the concentration of the brightener is preferably 0.02 to 1.2 percent, preferably 0.05 to 0.8 percent, in relation to the substrate. The brightener can be applied by the cold or warm pad-batch processes, with or without intermediate drying before fixation. In the finishing of textiles (e.g. wovens, knitted or nonwovens) with binders, in particular synthetic resins, the optical brightener may be added in the desired amount to the synthetic resin in the treating liquor or prior to application of the resin. Advantageously 0.02 to 1.2 percent, preferably 0.05 to 0.8 percent optical brightener relative to the substrate is added in this case. Depending on the nature of the brightener and the substrate, the brightener is fixed and the finishing agent cross-linked by the cold store or cold cross-linking process, or by heat treatment (steaming, dry heat or thermosol treatment), optionally after intermediate drying.

For brightening paper in the mass, advantageously 0.01 to 0.5 percent optical brightener based on the weight of the dry stock is employed.

For the treatment of paper in the size press, size press solutions containing e.g. 0.3 to 8 or preferably 0.5 to 6 grams per litre of the optical brightener may be employed; the amount of the brightener can of course be chosen to suit the nature and amount of the binder, the paper and the desired whiteness value. The concentration of binder is normally about 2 to 15 percent of the liquor. Optical brightening liquors for surface application to paper may contain further additives, e.g. white pigments and fillers; these are normally employed in amounts of about 10 to 65 percent on the weight of the coating composition, whereas the binder additions are about 5 to 25 percent. The optical brightener is employed preferably in amounts of about 0.3 to 6 grams per litre of the coating composition.

Examples of suitable binding agents are degraded starches, alginates, gelatines, polyvinyl alcohol, polyvinylpyrrolidone, carboxymethyl cellulose, caseine, protein, polyvinylydene, chloride and mixtures thereof, of which the degraded starch, the polyvinyl alcohol and carboxymethyl cellulose are particularly preferred. Also suitable are aqueous synthetic resin dispersions based on mixed polymers of acryl- and/or butadiene-styrene copolymers with approximately 50 percent synthetic resin content.

The fillers and white pigments commonly used in the paper industry are suitable, e.g. china clay, calcium carbonate "satin white," "Blancfiy," titanium dioxide, talc, precipitated aluminium silicates etc. and mixtures thereof.

In addition, coating compositions can contain water-soluble polyphosphates, metaphosphates and wetting agents, e.g. unsulphated or sulphated higher alkanols or alkyl phenol polyglycol ethers with 8 to 14 alkyl carbon atoms and 1 to 20 ethylene oxide groups. To obtain good flow properties the coating compositions for pigment application are preferably alkaline, best imparted by an addition of ammonium hydroxide, sodium or potassium hydroxides, carbonates, borates, perborates or mixtures thereof.

The anionic brightening agents of formula I can be fixed on polyamide substrates by the acid shock method. The water soluble brighteners of formula I are also suitable as additives to wash baths, especially to those containing bleaching agents.

The more highly water-soluble compounds of formula I are employed preferably in liquid form, i.e., in aqueous solutions which may contain suitable extenders. To obtain special effects, the compounds of formula I may be applied in combination with other brighteners; the hydrophilic extenders such as polyvinyl alcohol, optionally acylated polyethylene glycols, polyvinylpyrrolidone or urea, which in many cases adds appreciably to the white effect.

The invention is illustrated by the following Examples, in which the parts and percentages unless, otherwise stated, are by weight and the temperatures in degrees centigrade.

EXAMPLE 1

20 Parts of 4,4'-bis[4''-methyl-5''-carbethoxyvictriazolyl-(2'')]-stilbene-2,2'-disulphonic acid are entered in portions with stirring into a mixture of 25 parts of ethanol and 85 parts of hydrazine hydrate at 70°, on which the ester goes rapidly into solution. Stirring is continued for 2 hours at 70°–80° and after cooling to room temperature the pale colour precipitate is filtered off, washed with a 1:1 mixture of alcohol and water, and vacuum dried at 80°. 16 Parts of the pale-yellow hydrazide of formula

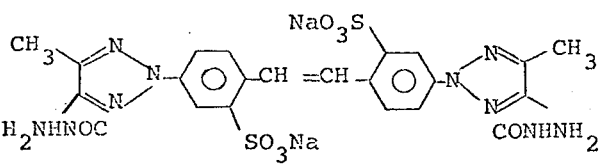

are obtained.

16 Parts of the hydrazide are finely dispersed in 180 parts of ortho-dichlorobenzene and 8 parts of pyridine. The dispersion is raised to 120° with stirring. In 30 minutes 75 parts of benzoylchloride are dropped in and the mixture stirred further for 4 hours at 140°–160°. After cooling to 90°, 22.8 parts of thionylchloride are dropped into the reaction mixture, then stirring is continued for 1 hour at 90°–120°. The yellow product is filtered off, washed with 50 parts of methanol, entered into 45 parts of 2 normal soda solution and stirred for 30 minutes at 40°. 15 Parts of sodium chloride are added and the product is then filtered off, washed with 25 parts of 5 percent NaCl solution and crystallized from a mixture of dimethylformamide and water. In aqueous-alcoholic solution the pale yellow compound fluoresces violet-blue (the absorption maximum in dimethylsulphoxide is at 362 nm). The compound has the formula

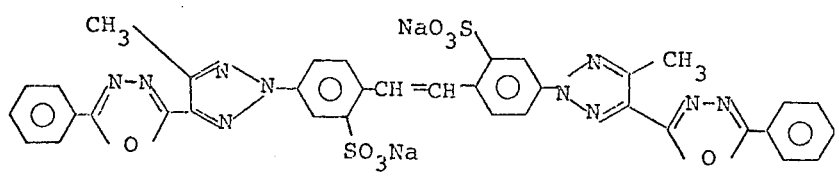

If in Example 1 instead of 7.5 parts of benzoylchloride the equivalent number of parts of another acid chloride RCOCl is used, further compounds conforming to this invention are obtained which have the general formula

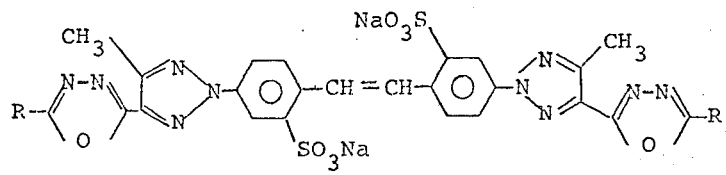

washed with 100 parts of a 10 percent (weight/volume) sodium chloride solution and dried at 70° in a vacuum oven. 60 Parts of the dry product are obtained.

16 Parts of the crude hydrazone are added to a mixture of 10 parts by volume of acetic anhydride, 60 parts

TABLE 1

| Example No. | R | Appearance of the product | Fluorescence shade in dimethyl-formamide-water-mixture | Absorption maximum in di-dimethyl sulphoxide |
|---|---|---|---|---|
| 2 | CH₃–⌬– | light yellow | violet-blue | 358 nm |
| 3 | (CH₃)₃C–⌬– | light yellow | violet-blue | 362 nm |
| 4 | CH₃O–⌬– | deep yellow powder | blue-green | 370 nm |
| 5 | Cl-⌬– (ortho) | yellow powder | violet | |
| 6 | Cl-⌬– (meta) | pale yellow | violet | |
| 7 | Cl–⌬– (para) | pale yellow powder | violet-blue | |
| 8 | ⌬–CH₃ | pale yellow powder | violet-blue | |
| 8a | –NaO₃S–⌬– | pale yellow powder | blue | |
| 8b | CH₃– | pale yellow powder | violet-blue | |

EXAMPLE 9

4 Parts of 4,4'-bis-hydrazino stilbene-2,2'disulphonic acid, 3.6 parts of 3-(α-oximinoacetyl)-pyridine, 3.43 parts of anhydrous sodium acetate and 138 parts of water are mixed and the mixture raised to the refluxing temperature in 15 minutes. An orange-red suspension is formed which is cooled to 20°. 13.8 Parts of sodium chloride are added and the mixture stirred for 15 minutes at 20°. The hydrazone formed is filtered off, by volume of dimethylformamide and 2 parts of anhydrous sodium acetate. The mixture is heated at 125°–135° for 20 hours, after which the dimethylformamide is removed under reduced pressure. The brown residue is diluted with 100 parts of water and 28 parts by volume of a 30 percent (weight/volume) sodium hydroxide solution are added. The bister-brown product is filtered off, washed with 10 percent (weight-/volume) sodium chloride solution and dried at 70°.

The yield is 4.5 parts. The crude product is recrystallized several times from aqueous ethyl alcohol. The pure product is obtained as a pale yellow powder and has the formula

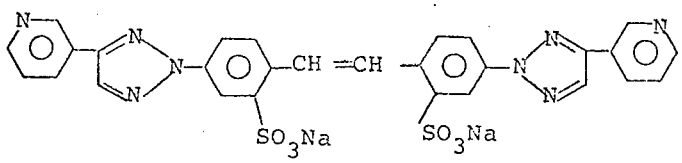

XVII

The 3-(α-oximinoacetyl)-pyridine is produced by the method described by H. O. Borrus and G. Powell in the Journal of the Americal Chemical Society, Volume 67, pages 1468–1472, by treating the 3-acetylpyridine with amylnitrile for introduction of the nitroso group.

EXAMPLE 10

A mixture of 19.85 parts of 4,4'-bis-hydrazinostilbene-2,2'-disulphonic acid, 19.5 parts of 1-oximino1-(3'-pyridyl)-2-propanone, 17.1 parts of anhydrous sodium acetate and 682 parts of water is held at the refluxing temperature for 15 minutes. The orange coloured mixture formed is cooled to 20° and 49.6 parts of sodium chloride are added. The suspension is stirred for 30 minutes at 20° and the orange coloured hydrazone formed then filtered off, washed with 300 parts by volume of a 15 percent (weight/volume) sodium chloride solution and vacuum dried at 70°. The yield is 47.4 parts dry weight. The crude hydrazone (47.4 parts) is added to a mixture of 450 parts by volume of dimethylformamide, 80 parts by volume of acetic anhydride and 15.6 parts of anhydrous sodium acetate. The mixture is held at 110° for 2 hours 30 minutes and stirred further for 8 hours at this temperature. The resulting mixture is cooled to 70° and the dimethylformamide removed under reduced pressure. The residue is diluted with 500 parts of water, raised to 70° and given an addition of 70 parts of sodium chloride. The grey coloured suspension is cooled to 20° and filtered. The crude product is dissolved at 80° in a mixture of 300 parts of water, 300 parts by volume of ethyl alcohol and 10 parts by volume of a 30 percent (weight/volume) sodium hydroxide solution. The solution is cooled to 20° and the crystallized yellow product filtered off and washed with 100 parts of water. The moist residue is dried at 70°. The yield is 12.2 parts dry weight. The product has the formula

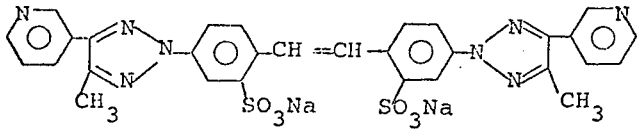

by volume of a 40 percent (weight/volume) sodium metabisulphite solution and 50 parts by volume of methyl alcohol is raised to the refluxing temperature, on which 1.5 parts by volume of acetic acid are added the mixture is held for 1 hour with reflux and the greater part of the methyl alcohol is then removed by distillation under reduced pressure. The red suspension of the hydrazone is cooled to 5°, filtered and the filter residue washed with 100 parts by volume of a 5 percent (weight/volume) sodium chloride solution and dried at 70°. The yield is 10.3 parts dry weight. The hydrazone (10.3 parts) is added to 60 parts by volume of pyridine and the mixture raised to 90°, on which a red-brown solution is formed. To this a solution of 10.3 parts of copper sulphate pentahydrate in 20 parts of water is added at 80°–90° in 5 minutes. The mixture is held for 2 hours 30 minutes at the refluxing temperature, then 30 parts of water are added and 40 parts by volume of aqueous pyridine distilled from the reaction mixture. Afterwards 30 parts of water and 35 parts of concentrated hydrochloric acid (specific gravity 1.18) are added and the brown suspension cooled to 20°. The product formed (triazole-N-oxide compound) is filtered and washed with 100 parts of water. The moist triazole-N-oxide compound (9.4 parts) is dissolved at refluxing temperature in a mixture of 40 parts by volume of dimethylformamide, 20 parts of water and 6 parts by volume of a glacial acetic acid, with the subsequent addition of 6 parts of zinc powder in 5 minutes. The mixture is held under reflux for 4 hours. It is then cooled to 20° and the crude triazole compound filtered and washed with 20 parts by volume of water. The crude triazole compound is then dissolved at the refluxing temperature in a mixture of 20 parts of water, 80 parts by volume of dimethylformamide and 2 parts of sodium hydroxide. The mixture is then filtered free from residual zinc and the filtrate cooled to 20°. The crystallized product is filtered, washed with 20 parts by volume of water and dried at 70°. It has the formula

XVIII

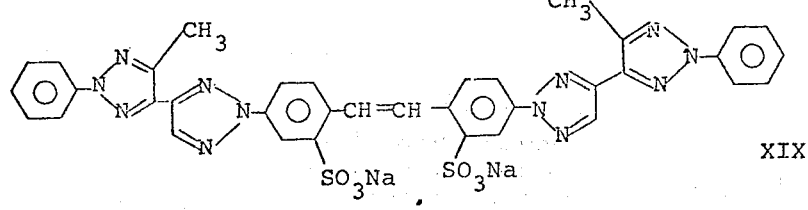

XIX

The 1-oximino-1,(3'-pyridyl)-2-propanone is obtained by the method described in Beach in the Journal of the Chemical Society 1955, page 3094, by arylation of α-oximinoacetone with diazotized 3-aminopyridine.

EXAMPLE 11

A mixture of 4.44 parts of sodium 4,4'-bishydrazinostilbene-2,2'-di-sulphonate, 5 parts of 2-phenyl-4-methyl-5-(α-oximino-acetyl)-v-triazole, 50 parts water, 0.25

The 2-phenyl-4-methyl-5-(α-oximinoacetyl)-v-triazole is produced from 2-phenyl-4-methyl-5-acetyl-v-triazole as follows.

35.4 Parts of 2-phenyl-4-methyl-5-acetyl-v-triazole are stirred at 0° into a mixture of 60 parts by volume of absolute ethylalcohol and 25.73 parts of isopropylnitrile. In 30 minutes a solution of 4.6 parts of sodium in 88 parts by volume of absolute ethyl alcohol are added at 0°. The suspension is stirred for 22 hours at 0°–5°.

The sodium salt of the 2-phenyl-4-methyl-5-(α-oximinoacetyl)-v-triazole formed is filtered and washed with 100 parts by volume of acetone. The sodium salt is dissolved in 200 parts of water and the solution cooled to 0°. At this temperature 40 parts by volume of glacial acetic acid are dropped in in 15 minutes. The whitish product is filtered, washed with 100 parts of water and dried at 70°. The yield is 9.2 parts dry weight, melting point 155°–160°. The crude product is recrystallized from 50 parts of water and 80 parts by volume of methyl alcohol, on which the 2-phenyl-4-methyl-5-(α-oximinoacetyl)-v-triazole is obtained in the form of white needles with melting point 159°–160°. The 2-phenyl-4-methyl-5-acetyl-v-triazole, melting point 55°–56°, is produced in analogy with the process for the production of 2-p-tolyl-4-methyl-5-acetyl-v-triazole described in Swiss Pat. No. 444.873.

EXAMPLE 12

6.6 Parts of the compound of formula XIX are added to 15.9 parts by volume of sulphuric monohydrate. The mixture is raised to 110° with stirring, stirred at this temperature for 1 hour and then run into 240 parts of water. 12 Parts of sodium chloride are added to the hot solution. A yellowish green suspension is formed which is cooled and filtered. The filtered precipitate is dissolved in a mixture of 100 parts of water and 50 parts by volume of ethyl alcohol at 80°. Then 10 parts by volume of a 30 percent sodium hydroxide solution are added and the solution filtered hot. On cooling to 20° the tetrasodium salt settles out. It is filtered and dried at 70°. The yield is 4.5 parts dry weight. It corresponds to the formula

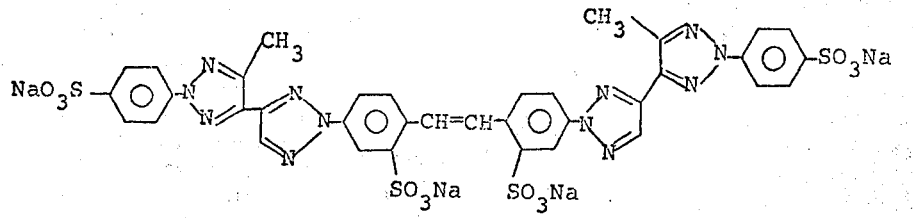

The following Table 2 contains further compounds produced in accordance with this invention which are distinguished by their structural formulae and the shade of their fluorescence in dimethylformamide/water mixture.

TABLE 2

| Example No. | Formula | Fluorescence Shade |
|---|---|---|
| 13 | [Structure with phenyl-oxadiazole-triazole-phenyl-CH=, SO₃Na]₂ | blue |
| 14 | [Structure with phenyl-pyrazole(NH)-triazole(CH₃)-phenyl-CH=, SO₃Na]₂ | blue |
| 15 | [Structure with phenyl-triazole(CH₂CH₃/CH₃)-triazole-phenyl-CH=, SO₃Na]₂ | blue-violet |

EXAMPLE 16

The product of Example 1, obtained benzoylation of the compound of formula XIV, is reacted in an autoclave at 100°–200° over the course of 5 hours with the stoichiometric amount of methylamine in chlorobenzene. The product is then filtered off, heated with 2 N-sodium hydroxide solution, precipitated with sodium chloride and filtered. Thus, the compound of formula

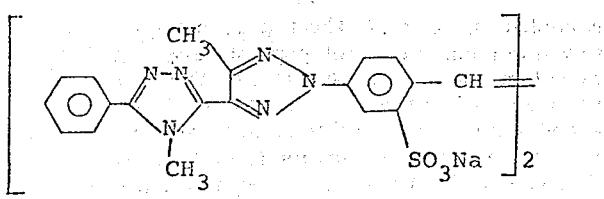

XXI is obtained in the form of a yellow powder which fluoresces blue in dimethylformamide.

EXAMPLE 17

14 Parts of the hydrazone described in Example 11 are dissolved in 136 parts by volume of pyridine and heated to 70°. A solution of 23.6 parts of copper sulphate pentahydrate in 46 parts by volume of water is added over the course of 15 minutes. The mixture is subsequently kept at reflux temperature for 3 hours. After the addition of 10 parts by volume of a 30 percent sodium hydroxide solution and 150 parts of water, 250 parts by volume of aqueous pyridine are distilled off and replaced by the simultaneous addition of 150 parts of water. After cooling to 40°, the pale yellow, crude N-oxide is filtered off and washed with 500 parts of water. The crude N-oxide is dissolved in 1000 parts by volume of dimethyl formamide and 500 parts of water, filtered in order to remove the copper-I-oxide, and the filtrate is evaporated to dryness. 9 Parts of the N-oxide are obtained as yellow powder.

The 9 parts of N-oxide are dissolved in 1000 parts by volume of dioxane and 200 parts of water and the mixture is heated to reflux temperature. Gaseous hydrochloric acid is regularly passed through the reaction mixture at this temperature over the course of 6 hours. The mixture is then cooled to 10°, the yellow precipitate is filtered, washed with 100 parts of water and dried at 70° in a drier. The obtained 6.1 parts (dry weight) of free acid are recrystallized from 70 parts of water and 130 parts by volume of dimethyl formamide (containing 5 parts by volume of 30 percent sodium hydroxide). Thus, 40 parts (dry weight) of a light yellow solid product are obtained which agrees with formula

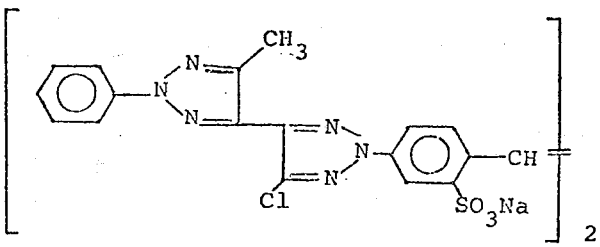

(XXII)

EXAMPLE 18

13.72 Parts of 2-(2'-chlorophenyl)-4-methyl-5-(α-oximino-acetyl)-v-triazole in 250 parts by volume of methanol and then 5 parts by volume of acetic acid and 5 parts by volume of a 40 percent (weight/volume) sodium metabisulphite solution are added to a solution of 10 parts of 4,4'-bishydrazinostilbene-2,2'-disulphonic acid in 125 parts of water and 5 parts of a 30 percent sodium hydroxide solution. The mixture is stirred at 70° for 1 hour, subsequently cooled to 20° and the methanol is removed at reduced pressure. After the addition of 50 parts by volume of a saturated sodium chloride solution the mixture is stirred at 10° for 15 minutes, the precipitated orange-red hydrazone is filtered and washed with 100 parts by volume of 10 percent (weight/volume) of sodium chloride solution. The resulting 33 parts of moist hydrazone are added to 150 parts by volume of pyridine and the mixture is heated to 60°. A solution of 25.75 parts of copper sulphate pentahydrate in 50 parts of water are added dropwise over the course of 30 minutes and the mixture is subsequently heated to reflux temperature. The mixture is kept at this temperature for 3 hours, 10 parts of 30 percent sodium hydroxide solution are subsequently added and 300 parts by volume of aqueous pyridine are distilled off from the reaction mixture. By the addition of 300 parts of water the aqueous pyridine is continuously replaced. The copper-I-oxide which contains the N-oxide is dried at 70°. The resulting 14 parts of crude N-oxide are dissolved at 100° in 200 parts by volume of dimethyl formamide and 150 parts of water and the mixture is filtered in order to remove the copper-I-oxide. To the clear filtrate are added 20 parts by volume of acetic acid and subsequently 25 parts of zinc in powder form. The mixture is kept at reflux temperature for 18 hours and filtered in order to remove the excess zinc. After the addition of 400 parts of water and cooling to 20°, the precipitated triazole is filtered and washed with 100 parts of water. The crude triazole is recrystallized from 30 parts of water and 70 parts by volume of dimethylformamide [containing 3 parts of 30 percent (weight/volume) sodium hydroxide]. Thus, 5.4 parts of a yellow powder are obtained which agrees with formula

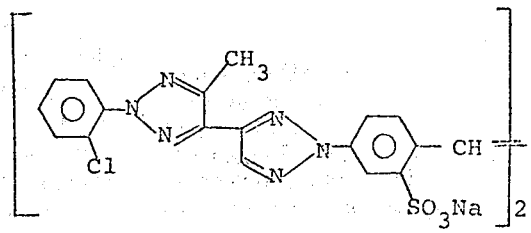

XXIII

The 2-(2'-chlorophenyl)-4-methyl-5-(α-oximinoacetyl)-v-triazole can be produced from 2-(2'-chlorophenyl)-4-methyl-5-acetyl-v-triazole in analogous manner to 2-phenyl4-methyl-5-(α-oximinoacetyl)-v-triazole described in Example 11. It is recrystallized from methanol and thus, a product, having a M.P. of 155°–159°, is obtained.

The 2-(2'-chlorophenyl)-4-methyl-5-acetyl-v-triazole may be produced by the method described in Swiss Pat. No. 444.873 for the production of 2-(p-tolyl)-4-methyl-5-acetyl-v-triazole.

Further compounds of formula

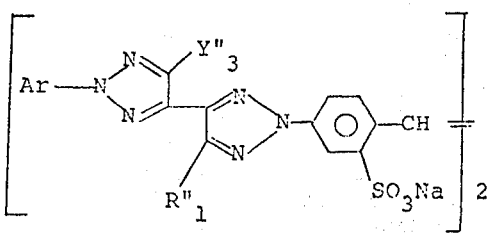

XXIV are indicated in the following Table 3. They may be produced in manner analogous to that described in Examples 11, 17 and 18 (the compound of Example 28 is obtained in analogy with Example 12). They are characterized by the significance of the radicals Ar, $R''_1$ and $Y''_3$ and the colour of the resulting product which is obtained in the form of powder.

| Exp. No. | Ar | $R''_1$ | $Y''_3$ | Colour of the powdery product |
|---|---|---|---|---|
| 19 | Cl—⟨O⟩— | H | $CH_3$ | light yellow |
| 20 | Cl—⟨O⟩— | Cl | $CH_3$ | yellow |
| 21 | ⟨O⟩— (Cl) | H | $CH_3$ | light yellow |
| 22 | ⟨O⟩— (Cl) | Cl | $CH_3$ | yellow |
| 23 | $CH_3$—⟨O⟩— | H | $CH_3$ | light yellow |
| 24 | $CH_3$—⟨O⟩— | Cl | $CH_3$ | yellow |
| 25 | $CH_3O$—⟨O⟩— | H | $CH_3$ | brilliant yellow |
| 26 | Cl,Cl—⟨O⟩— | H | $CH_3$ | yellow |
| 27 | $CH_3$—⟨O⟩— | H | $CH_3$ | light yellow |
| 28 | $NaO_3S$,$CH_3$—⟨O⟩— | H | $CH_3$ | yellow |
| 29 | ⟨O⟩— | $CH_3$ | $CH_2CH_3$ | yellow |

APPLICATION EXAMPLE A

5 Parts of a white "Banlon" nylon 6.6 fabric are entered into a solution at 40° containing 0.01 part of the compound of formula XXIII and 1.5 parts by volume of a 10 percent aqueous acetic acid solution in 200 parts of water. The bath is raised to 90°–95° in 30 minutes and the fabric treated for 30 minutes at this temperature. It is then removed from the bath, rinsed with dilute sodium carbonate solution, then rinsed thoroughly with water and dried at 80°. The treated fabric shows a brilliant brightener effect of neutral shade.

APPLICATION EXAMPLE B

5 Parts of a white "Banlon" nylon 6.6 fabric are entered into a bath at 40° containing 0.01 part of the triazole compound of formula XIX and 0.4 parts of sodium chloride in 200 parts of water which is buffered to pH 3.5. The buffer system consists of 0.14 parts of sodium perborate, 0.12 parts of sodium nitrate, 0.12 parts of trisodium polyphosphate, 0.02 parts of a condensation product from di-secondary butylphenol and ethylene oxide and 2.5 parts by volume of 10% formic acid. The bath is raised to 90°–95° in 30 minutes and the fabric treated for a further 30 minutes at this temperature. It is then removed, rinsed in cold demineralized water, then in 1% aqueous sodium metabisulphate solution and finally in cold demineralized water, after which it is dried at 80°. The treated nylon 6.6 fabric shows a brilliant optical white of neutral shades.

APPLICATION EXAMPLE C

A cotton fabric is put into 200 parts by volume (bath proportion 1:40) of an aqueous solution of 0.01 parts of the brightener, obtained according to Example 12, (formula XX) and 0.5 parts of sodium sulphate decahydrate and the bath is heated to 70° over the course of 15 minutes and while moving the fabric continuously. The bath is kept at this temperature for a further 30 minutes and while moving the fabric continuously. The fabric is then removed from the bath, rinsed with cold water, centrifuged and dried at 80° in a drier. A brilliant optically brightened fabric is obtained.

APPLICATION EXAMPLE D

A fabric strip of Nylon 6.6 is padded to an increase of 100 percent on the dry weight with an aqueous bath containing 0.2 percent of the triazole obtained in accordance with Example 12 (formula XX). The fabric is then boiled for 1 minute in an aqueous solution containing 0.2 percent of acetic acid (bath proportion 1:30), subsequently washed for 1 minute in boiling water, rinsed in cold demineralized water and finally dried at 80° in a drier. A brilliant optically brightened fabric is obtained.

What is claimed is:

1. A compound of formula I,

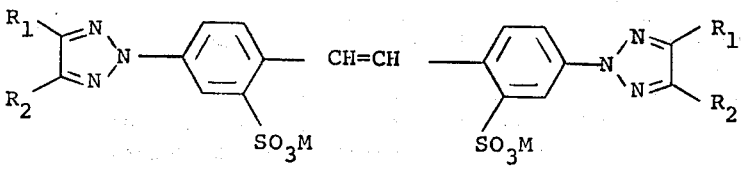

I wherein
the $R_1$'s are the same and each is hydrogen; chloro; $C_{1-4}$ alkyl; phenyl; phenyl substituted by up to two substituents selected from the group consisting of $C_{1-4}$ alkyl, $C_{1-4}$ alkoxy, fluoro, or chloro; or biphenyl,
the $R_2$'s are the same and each is a radical of formula (a), (b), or (c),

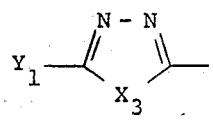

wherein
$Y_1$ is $C_{1-4}$ alkyl; phenyl; or phenyl substituted by up to two substituents selected from the group consisting of $C_{1-4}$ alkyl, $C_{1-4}$ alkoxy, fluoro, chloro or -$SO_3M$, and
$X_3$ is -O- or -$NY_5$-, where $Y_5$ is hydrogen; $C_{1-4}$ alkyl; $C_{1-4}$ alkyl monosubstituted by chloro; or $C_{2-4}$ alkyl monosubstituted by hydroxy or -$SO_3M$,

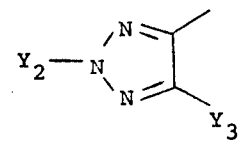

wherein
$Y_2$ is naphthyl, unsubstituted or monosubstituted by $C_{1-4}$ alkyl, $C_{1-4}$ alkoxy or -$SO_3M$; phenyl; or phenyl substituted by up to two substituents selected from the group consisting of fluoro, chloro, $C_{1-4}$ alkyl, $C_{1-4}$ alkoxy or -$SO_3M$, and
$Y_3$ is hydrogen; chloro; $C_{1-4}$ alkyl; phenyl; or phenyl substituted by up to two substituents selected from the group consisting of $C_{1-4}$ alkyl, $C_{1-4}$ alkoxy, fluoro, chloro or -$SO_3M$, and

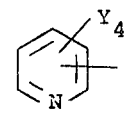

wherein $Y_4$ is hydrogen or $C_{1-4}$ alkyl, and M is hydrogen or a non-chromophoric cation, with the proviso that any substituted phenyl is substituted by no more than one -$SO_3M$ substituent.

2. A compound of claim 1, wherein $R_2$ is a radical of formula (a), $Y_1$, therein, is $C_{1-4}$ alkyl, unsubstituted phenyl or phenyl substituted by a substituent selected from $C_{1-4}$ alkyl, $C_{1-4}$ alkoxy, chloro and -$SO_3M$ and, where $X_3$, therein, is -$NY_5$-, $Y_5$ is hydrogen or $C_{1-4}$ alkyl, and wherein $R_1$ is hydrogen, $C_{1-4}$ alkyl, chloro, unsubstituted phenyl or phenyl substituted by chloro.

3. A compound of claim 2, wherein $R_1$ is hydrogen, $C_{1-4}$ alkyl or chloro.

4. A compound of claim 3, wherein $R_1$ is hydrogen or methyl.

5. A compound of claim 1, wherein $R_2$ is a radical of formula (b), $Y_2$, therein, is unsubstituted phenyl or phenyl substituted by up to two substituents selected from $C_{1-4}$ alkyl, $C_{1-4}$ alkoxy, chloro and -$SO_3M$, provided only one -$SO_3M$ group is borne thereby, and $Y_3$, therein, is $C_{1-4}$ alkyl, and wherein $R_1$ is hydrogen, $C_{1-4}$ alkyl, chloro, unsubstituted phenyl or phenyl substituted by chloro, $Y_3$ and $R_1$ being different.

6. A compound of claim 5, wherein $R_1$ is hydrogen, $C_{1-4}$ alkyl or chloro.

7. A compound of claim 6, wherein $R_1$ is hydrogen or methyl.

8. A compound of claim 1, wherein $R_2$ is a radical of formula (c), $Y_4$, therein, is hydrogen, and wherein $R_1$ is hydrogen, $C_{1-4}$ alkyl, chloro, unsubstituted phenyl or phenyl substituted by chloro.

9. A compound of claim 8, wherein $R_1$ is hydrogen, $C_{1-4}$ alkyl or chloro.

10. A compound of claim 9, wherein $R_1$ is hydrogen or methyl.

11. A compound of claim 2, wherein $X_3$ is -O-.
12. A compound of claim 2, wherein $X_3$ is -N-$Y_5$-.
13. A compound of claim 3, wherein $X_3$ is -O-.
14. A compound of claim 3, wherein $X_3$ is -N$Y_5$-.
15. A compound of claim 4, wherein $X_3$ is -O-.
16. A compound of claim 4, wherein $X_3$ is -N$Y_5$-.
17. A compound of claim 1, of formula I'

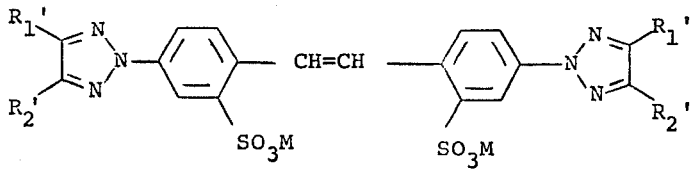

wherein the $R_1$'s are the same and each is hydrogen, chloro or $C_{1-4}$ alkyl, the $R_2$'s are the same and each is a radical of formula (a'), (b') or (c'),

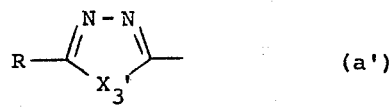

where R is $C_{1-4}$ alkyl, unsubstituted phenyl or phenyl substituted by a substituent selected from $C_{1-4}$ alkyl, $C_{1-4}$ alkoxy, chloro and -$SO_3M$, and $X_3'$ is -O- or -N$Y_5'$- where $Y_5'$ is hydrogen or $C_{1-4}$ alkyl,

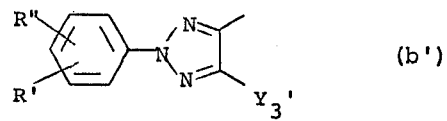

where R' is hydrogen, chloro, $C_{1-4}$ alkyl, $C_{1-4}$ alkoxy or -$SO_3M$,
R" is hydrogen, chloro, $C_{1-4}$ alkyl or $C_{1-4}$ alkoxy, and
$Y_3'$ is $C_{1-4}$ alkyl, and

M is as defined in claim 1.

18. A compound of claim 17, wherein $R_2'$ is a radical of formula (a').

19. A compound of claim 18, wherein $X_3'$ is -O-.
20. A compound of claim 18, wherein $X_3'$ is -N$Y_5'$-.
21. A compound of claim 17, wherein $R_2'$ is a radical of formula (b').
22. A compound of claim 17, wherein $R_2'$ is a radical of formula (c').
23. A compound of claim 17, wherein $R_1'$ and $Y_3'$ are different.
24. A compound of claim 21, wherein $R_1'$ and $Y_3'$ are different.

25. A compound of claim 17, wherein $R_1'$ is hydrogen or methyl and $R_2'$ is a radical of formula (a") or ("')

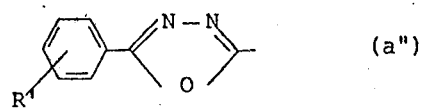

in which R' is as defined in claim 21,

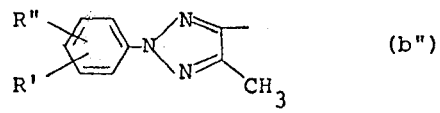

in which R' and R" are as defined in claim 21, with the proviso that where $R_2'$ is a radical of formula (b"), $R_1'$ is hydrogen.

26. A compound of claim 25, wherein $R_2'$ is a radical of formula (a").
27. A compound of claim 25, wherein $R_2'$ is a radical of formula (b").
28. A compound of claim 27, wherein R" is hydrogen.
29. A compound of claim 28, of formula

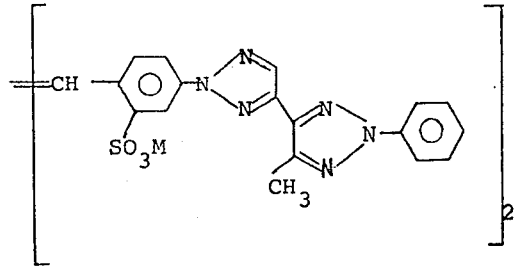

in which M is as defined in claim 28.

30. A compound of claim 28, of formula

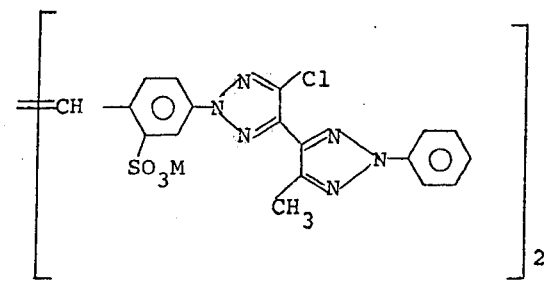

in which M is as defined in claim 28.

31. A compound of claim 28, of formula

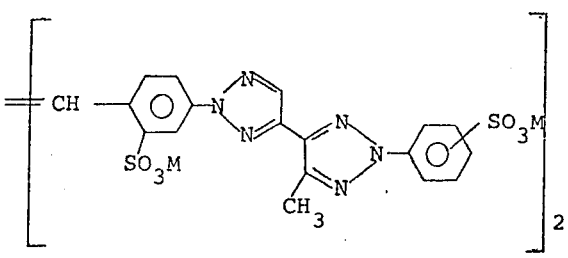

in which M is as defined in claim 28.

32. A compound of claim 1, where M is hydrogen, an alkali metal or alkaline earth metal cation or a cation of formula $R_{10}R_{11}R_{12}NH^+$, where $R_{10}$, $R_{11}$ and $R_{12}$, independently, each is hydrogen or a $C_{1-4}$ alkyl radical, unsubstituted or substituted by up to two hydroxy groups.

33. A compound of claim 29, where M is hydrogen, an alkali metal or alkaline earth metal cation or a cation of formula $R_{10}R_{11}R_{12}NH^+$, where $R_{10}$, $R_{11}$ and $R_{12}$, independently, each is hydrogen or a $C_{1-4}$ alkyl radical, unsubstituted or substituted by up to two hydroxy groups.

34. A compound of claim 30, where M is hydrogen, an alkali metal or alkaline earth metal cation or a cation of formula $R_{10}R_{11}R_{12}NH^+$, where $R_{10}$, $R_{11}$ and $R_{12}$, independently, each is hydrogen or a $C_{1-4}$ alkyl radical, unsubstituted or substituted by up to two hydroxy groups.

35. A compound of claim 31, where M is hydrogen, an alkali metal or alkaline earth metal cation or a cation of formula $R_{10}R_{11}R_{12}NH^+$, where $R_{10}$, $R_{11}$ and $R_{12}$, independently, each is hydrogen or a $C_{1-4}$ alkyl radical, unsubstituted or substituted by up to two hydroxy groups.

36. A compound of claim 33, wherein M is hydrogen or a sodium cation.

37. A compound of claim 34, wherein M is hydrogen or a sodium cation.

38. A compound of claim 35, wherein M is hydrogen or a sodium cation.

* * * * *